US010751707B2

(12) United States Patent
Shibai et al.

(10) Patent No.: US 10,751,707 B2
(45) Date of Patent: Aug. 25, 2020

(54) EXHAUST UNIT AND IMAGE FORMING APPARATUS

(71) Applicant: Sharp Kabushiki Kaisha, Sakai, Osaka (JP)

(72) Inventors: Yasuhiro Shibai, Sakai (JP); Hiroshi Onda, Sakai (JP); Tomoya Tsutsumino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 346 days.

(21) Appl. No.: 15/631,018

(22) Filed: Jun. 23, 2017

(65) Prior Publication Data

US 2018/0001312 A1 Jan. 4, 2018

(30) Foreign Application Priority Data

Jul. 4, 2016 (JP) .................................. 2016-132532

(51) Int. Cl.

| *B01J 35/00* | (2006.01) |
|---|---|
| *B01J 35/06* | (2006.01) |
| *B01J 35/04* | (2006.01) |
| *B01J 37/34* | (2006.01) |
| *B01D 53/34* | (2006.01) |
| *B01J 23/652* | (2006.01) |
| *B01J 37/02* | (2006.01) |
| *B01D 53/66* | (2006.01) |

(52) U.S. Cl.
CPC ............ *B01J 35/004* (2013.01); *B01D 53/34* (2013.01); *B01D 53/66* (2013.01); *B01J 23/6527* (2013.01); *B01J 35/04* (2013.01); *B01J 35/06* (2013.01); *B01J 37/0219* (2013.01); *B01D 2255/802* (2013.01); *B01D 2257/708* (2013.01); *B01D 2259/802* (2013.01); *B01J 37/345* (2013.01)

(58) Field of Classification Search
None
See application file for complete search history.

(56) References Cited

U.S. PATENT DOCUMENTS

| 6,531,100 | B1 * | 3/2003 | Ogata ................... B01J 35/002 |
|---|---|---|---|
| | | | 422/177 |
| 2003/0050196 | A1 * | 3/2003 | Hirano ...................... A61L 9/00 |
| | | | 507/238 |
| 2006/0060751 | A1 | 3/2006 | Nishimura et al. |
| 2010/0292075 | A1 | 11/2010 | Nakano et al. |
| 2012/0171079 | A1 * | 7/2012 | Morito .................... A61L 2/088 |
| | | | 422/121 |

(Continued)

FOREIGN PATENT DOCUMENTS

| CN | 1752871 A | 3/2006 |
|---|---|---|
| JP | 2001-265179 A | 9/2001 |

(Continued)

*Primary Examiner* — Kishor Mayekar
(74) *Attorney, Agent, or Firm* — Keating & Bennett, LLP

(57) ABSTRACT

The present disclosure provides a photocatalyst filter that can efficiently decompose and eliminate ozone gas or VOC and has a low ventilation resistance. The photocatalyst filter includes a sheet-like filter substrate and a photocatalyst layer supported by the filter substrate. The photocatalyst layer exhibits a photocatalytic action by receiving light having a wavelength of 400 nm or more. The photocatalyst filter has an aperture ratio of 35% or more and 80% or less.

8 Claims, 6 Drawing Sheets

(56) References Cited

U.S. PATENT DOCUMENTS

2013/0034470 A1* 2/2013 Wang ................ B01D 53/8668
                                                    422/121
2016/0367968 A1* 12/2016 Guerrero ................ B01J 37/345

FOREIGN PATENT DOCUMENTS

| JP | 2005-205406 A | 8/2005 |
| --- | --- | --- |
| JP | 2005-254167 A | 9/2005 |
| JP | 2005-309280 A | 11/2005 |
| JP | 2006-039168 A | 2/2006 |
| JP | 2006-251737 A | 9/2006 |
| JP | 2007-165255 A | 6/2007 |
| JP | 2009-233655 A | 10/2009 |

* cited by examiner

EXHAUST UNIT AND IMAGE FORMING APPARATUS

BACKGROUND

1. Field

The present disclosure relates to a photocatalyst filter, a photocatalyst filter laminate, an exhaust unit, and an image forming apparatus.

2. Description of the Related Art

In an image forming apparatus utilizing a photoreceptor, in general, a charger charges the photoreceptor; an exposure unit forms an electrostatic latent image on the surface of the photoreceptor; and a developing device allows a toner to adhere to the electrostatic latent image to form a toner image on the surface of the photoreceptor. The toner image is then transferred from the photoreceptor to paper that has been fed, and a fixing device heats the paper on which the toner image has been transferred to fix the toner image to the paper. Furthermore, a cleaning unit removes the residual toner on the photoreceptor.

In some cases, for example, the charger may generate ozone gas or NOx. In addition, the toner heated with the fixing device may generate volatile organic compounds (VOC) in some cases.

An image forming apparatus provided with a cylindrical harmful-substance removing device arranged so as to be adjacent to the charger in order to remove ozone gas or NOx is known (e.g., see Japanese Unexamined Patent Application Publication No. 2001-265179). This harmful-substance removing device removes ozone gas or NOx in a photocatalyst layer disposed on the inner wall of a cylindrical member.

An image forming apparatus provided with an exhaust cleaner for removing ozone gas or VOC is known (e.g., see Japanese Unexamined Patent Application Publication No. 2006-039168). This exhaust cleaner decomposes ozone gas or VOC by irradiating a photocatalyst sheet with ultraviolet light inside a case having an exhaust port.

An image forming apparatus having a duct for exhausting air present near the charger or the fixing device to the outside is known (e.g., see Japanese Unexamined Patent Application Publication No. 2006-251737). In this duct, a filter supporting a photocatalyst is disposed, and this photocatalyst decomposes ozone gas or VOC.

SUMMARY

In known image forming apparatuses, ozone gas or VOC cannot be efficiently decomposed in some cases. In addition, in known image forming apparatuses, a filter supporting a photocatalyst has high ventilation resistance and inhibits the exhaust, resulting in insufficient heat dissipation of the image forming apparatus in some cases.

The present disclosure has been made in view of the above circumference and provides a photocatalyst filter that can efficiently decompose and eliminate ozone gas or VOC and has low ventilation resistance.

According to an aspect of the disclosure, there is provided a photocatalyst filter including a sheet-like filter substrate and a photocatalyst layer supported by the filter substrate. The photocatalyst layer exhibits a photocatalytic action by receiving light having a wavelength of 400 nm or more, and the photocatalyst filter has an aperture ratio of 35% or more and 80% or less.

Since the photocatalyst filter of the present disclosure includes a filter substrate and a photocatalyst layer supported by the filter substrate, ozone gas or VOC in air can be efficiently decomposed and eliminated by irradiating the photocatalyst layer with light and allowing the air containing ozone gas or VOC to pass through the filter.

The photocatalyst layer supported by the filter substrate exhibits the photocatalytic action by receiving light having a wavelength of 400 nm or more. Accordingly, visible light can be used for decomposing and eliminating ozone gas or VOC.

The filter substrate is sheet-like, and the aperture ratio of the photocatalyst filter is 35% or more and 80% or less. Accordingly, the ventilation resistance of the photocatalyst filter can be reduced, and the ozone gas or VOC contained in the air that is allowed to pass through the filter can be efficiently decomposed and eliminated. Consequently, even if the photocatalyst filter is attached to the exhaust port of, for example, an image forming apparatus, it is possible to prevent the photocatalyst filter from inhibiting the exhaust and from suppressing heat dissipation.

DESCRIPTION OF THE EMBODIMENTS

Figure 1:
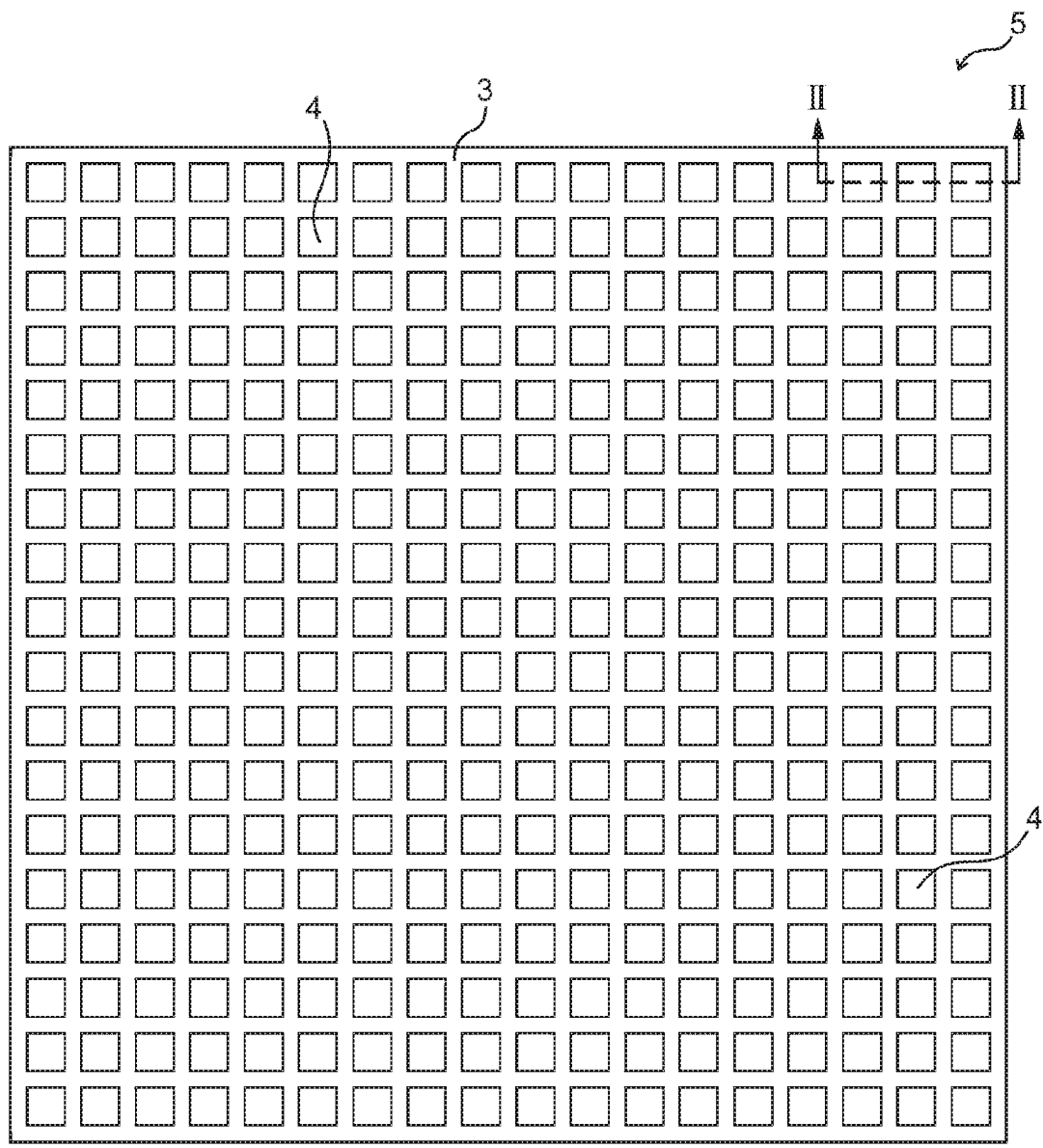
FIG. 1 is a schematic plan view of a photocatalyst filter of an embodiment of the present disclosure.

The photocatalyst filter of the present disclosure is a photocatalyst filter including a sheet-like filter substrate and a photocatalyst layer supported by the filter substrate. The photocatalyst layer exhibits a photocatalytic action by receiving light having a wavelength of 400 nm or more, and the photocatalyst filter has an aperture ratio of 35% or more and 80% or less.

The photocatalyst filter of the present disclosure may have a curved shape. Such a configuration can uniformly irradiate the photocatalyst filter with light and can suppress occurrence of unevenness in the photocatalytic activity of the photocatalyst filter.

The present disclosure also provides a photocatalyst filter laminate composed of a plurality of the photocatalyst filters of the present disclosure being stacked. The photocatalyst filter laminate can efficiently decompose and eliminate ozone gas or VOC contained in the air that is allowed to pass through the laminate.

The photocatalyst filter laminate of the present disclosure may have a thickness of 1 mm or more and 10 mm or less. Such a thickness can increase the probability that ozone gas or VOC contained in the air that is allowed to pass through the photocatalyst filter laminate is decomposed by the photocatalyst layer and can improve the reactivity.

The present disclosure also provides an exhaust unit including the photocatalyst filter of the present disclosure or the photocatalyst filter laminate of the present disclosure; a first light source section irradiating the photocatalyst filter or the photocatalyst filter laminate with light having a wavelength of 400 nm or more; and an exhaust fan configured so as to discharge gas from an exhaust port. The photocatalyst filter or the photocatalyst filter laminate is disposed in the exhaust port. The exhaust unit can exhaust the air inside an apparatus provided with this exhaust unit and can dissipate heat and also can efficiently decompose and eliminate ozone gas or VOC contained in the exhaust gas.

The photocatalyst filter or the photocatalyst filter laminate included in the exhaust unit of the present disclosure may have a curved shape, and the first light source section may be configured so as to irradiate light to the concave surface of the photocatalyst filter or the concave surface of the photocatalyst filter laminate. Such a configuration can uniformly irradiate the photocatalyst filter or the photocatalyst filter laminate with light and can suppress occurrence of unevenness in the photocatalytic activity of the photocatalyst filter.

The photocatalyst filter laminate included in the exhaust unit of the present disclosure may be configured such that a first photocatalyst filter disposed at the surface receiving the light from the first light source section has an aperture ratio higher than that of a second photocatalyst filter disposed on the central portion or at the surface opposite to the light-receiving surface. Such a configuration can increase the amount of light received by the second photocatalyst filter and can enhance the photocatalytic activity of the second photocatalyst filter.

The first light source section included in the exhaust unit of the present disclosure may include a light emitting diode and may be configured so as to irradiate the surface of the photocatalyst filter or the surface of the photocatalyst filter laminate at an illuminance of 1000 lux or more and 3000 lux or less. Such a configuration allows the photocatalyst filter or the photocatalyst filter laminate to have a high photocatalytic activity.

The exhaust unit of the present disclosure may include an ozone gas-supplying section supplying ozone gas to the photocatalyst filter or the photocatalyst filter laminate. In such a configuration, active oxygen can be generated from the ozone gas in the photocatalyst layer, and this active oxygen can efficiently oxidatively eliminate VOC.

The present disclosure also provides an image forming apparatus including an exhaust unit of the present disclosure and a printing section performing charging, exposure, development, transfer, and fixing, wherein the exhaust fan is configured such that the gas heated by the printing section is discharged from the exhaust port to dissipate heat, and the ozone gas and volatile organic compounds generated in the printing section are supplied to the photocatalyst filter or the photocatalyst filter laminate. This image forming apparatus discharges exhaust gas after decomposition and elimination of ozone gas and VOC with the photocatalyst filter or the photocatalyst filter laminate and therefore can suppress the discharge of ozone gas and VOC to the outside of the apparatus.

The image forming apparatus of the present disclosure may include a first window section and a second light source section for an image scanner. The first window section may be configured such that the photocatalyst filter or the photocatalyst filter laminate is irradiated with the light from the second light source section. Such a configuration can increase the amount of light received by the photocatalyst filter or the photocatalyst filter laminate and can enhance the photocatalytic activity of the photocatalyst layer.

The image forming apparatus of the present disclosure may include a second window section. The second window section may be configured such that the photocatalyst filter or the photocatalyst filter laminate is irradiated with the light from the outside of the image forming apparatus. Such a configuration can increase the amount of light received by the photocatalyst filter or the photocatalyst filter laminate and can enhance the photocatalytic activity of the photocatalyst layer.

An embodiment of the present disclosure will now be described with reference to the drawings. The configurations shown in the drawings and the following descriptions are merely examples, and the scope of the present disclosure is not limited to those shown in the drawings and the following descriptions.

First Embodiment

Figure 2:
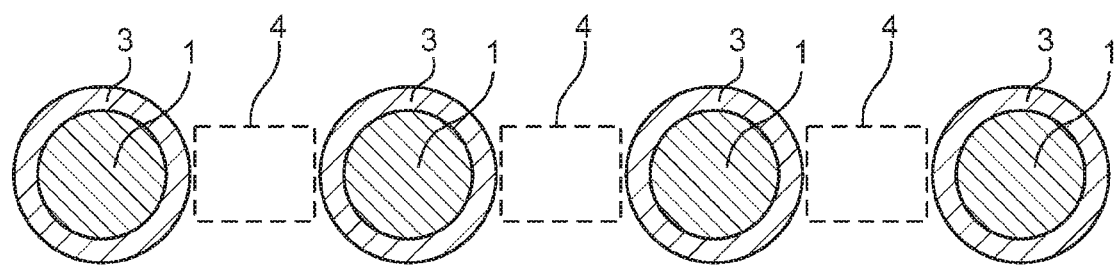
FIG. 2 is a schematic cross-sectional view of the photocatalyst filter taken along the broken line II-II of FIG. 1.

FIG. 1 is a schematic plan view of a photocatalyst filter of this Embodiment, and FIG. 2 is a schematic cross-sectional view of the photocatalyst filter taken along the broken line II-II of FIG. 1.

The photocatalyst filter 5 of the Embodiment includes a sheet-like filter substrate 1 and a photocatalyst layer 3 supported by the filter substrate 1. The photocatalyst layer 3 exhibits a photocatalytic action by receiving light having a wavelength of 400 nm or more, and the photocatalyst filter 5 has an aperture ratio of 35% or more and 80% or less.

The photocatalyst filter 5 of the Embodiment can be applied to, for example, an air cleaner, a gas treatment apparatus, a deodorizing apparatus, and a sterilization (antibacterial) apparatus. Furthermore, the photocatalyst filter 5 can provide additional functions to application products, such as a vacuum cleaner, a washing machine, a lighting system, an air conditioner, and a copier. The photocatalyst filter 5 of Second Embodiment is also the same.

The filter substrate 1 is, for example, wire netting, punching metal, expand metal, non-woven fabric, fabric, resin molding, or a paper honeycomb sheet. The material of the filter substrate 1 can be a material that is not deteriorated by the photocatalytic action of the photocatalyst 3.

The aperture ratio of the filter substrate 1 can be, for example, 37% or more and 82% or less.

The material of the filter substrate 1 may be a metal. This allows the photocatalyst filter 5 to be bent, and the photocatalyst filter 5 can be uniformly irradiated with light.

The photocatalyst layer 3 can contain a photocatalyst material, such as titanium dioxide ($TiO_2$), zinc oxide (ZnO), iron oxide ($Fe_2O_3$), tungsten oxide ($WO_3$), or gallium phosphide (GaP). The photocatalyst material is desirably a metal ion-doped photocatalyst doped with, for example, nickel (Ni), platinum (Pt), or ruthenium (Rh). In particular, platinum-doped tungsten oxide, which has high activity in the visible light region, can be suitably used.

The photocatalyst material may be a powder or a thick film or a thin film.

The photocatalyst layer 3 may contain a platinum-supporting carbon powder. The photocatalyst layer 3 may further contain a binder, such as a phenyl methyl silicone resin.

A photocatalyst material, such as $TiO_2$ and $WO_3$, irradiated with light generates an electron and a hole. The electron reacts with oxygen in air to become a superoxide radical ($.O_2^-$), whereas the hole reacts with moisture in air to become a hydroxyl radical (.OH). These radicals have a high oxidizing power and therefore can oxidatively decompose VOC and so on. The superoxide radical and the hydroxyl radical have high oxidizing powers as follows:

Oxidizing power: $.OH > .O_2^- > .O$ (active oxygen) $> HO_2^- > O_3 > O_2$

The photocatalyst layer 3 can be formed by, for example, mixing a photocatalyst powder, a platinum-supporting carbon powder, a binder, and a solvent to prepare a photocatalyst dispersion, applying this photocatalyst dispersion to a filter substrate 1, and drying the coated layer. Alternatively, the photocatalyst layer 3 may be formed by a thermal spraying method where a heated and melted photocatalyst powder is applied to a filter substrate 1 at a high speed for fusing.

As the photocatalyst filter 5, for example, metal mesh supporting a photocatalyst on the surface, non-woven fabric supporting a photocatalyst, or paper supporting a photocatalyst and formed into a honeycomb shape can be used.

The photocatalyst filter 5 has an aperture ratio of 35% or more and 80% or less, preferably 40% or more and 75% or less.

The aperture ratio is the proportion of the through opening area per unit area and can be measured with an image processor.

If the aperture ratio of the photocatalyst filter 5 is too high, the probability that ozone gas or VOC contained in the air that is allowed to pass through the photocatalyst filter 5 is not decomposed by the photocatalyst layer is increased, resulting in a decrease in the ability of decomposing ozone gas and VOC.

A too low aperture ratio of the photocatalyst filter 5 increases the ventilation resistance of the photocatalyst filter 5, resulting in a decrease in the ventilation volume. Accordingly, in an apparatus having an exhaust port provided with the photocatalyst filter 5, the exhaust volume of the apparatus decreases, and the temperature inside the apparatus increases. Consequently, a risk of overheat of the apparatus is caused. In addition, if the photocatalyst filter 5 is disposed in the exhaust port of an image forming apparatus, the temperature inside the apparatus increases, leading to a decrease in the fluidity of toner and causing image defects.

The photocatalyst filter 5 can have a thickness of, for example, 0.1 mm or more and 5 mm or less.

Second Embodiment

Figure 3A:
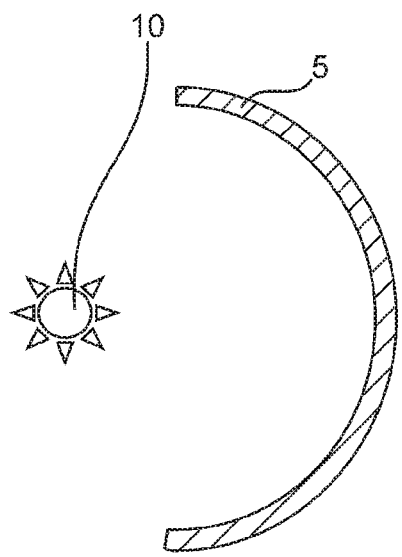
FIG. 3A is a schematic cross-sectional view of a photocatalyst filter of an embodiment of the present disclosure.
Figure 3B:
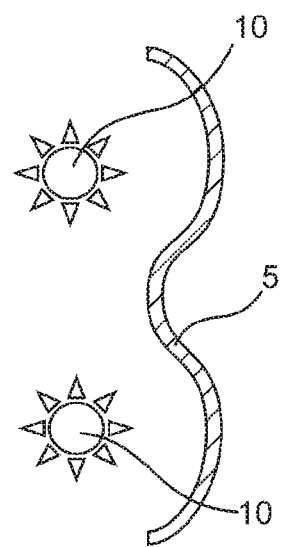
FIG. 3B is a schematic cross-sectional view of another photocatalyst filter of the embodiment of the present disclosure.

FIGS. 3A and 3B are schematic cross-sectional views of photocatalyst filters 5 of this Embodiment. The photocatalyst filters 5 of the Embodiment have curved shapes. Except this point, the configuration is the same as that of the photocatalyst filter 5 of First Embodiment.

The filter substrate 1 included in the photocatalyst filter 5 of the Embodiment can be wire netting, punching metal, or expand metal. These metal materials have high workability and allow the photocatalyst filter 5 to be bent.

The photocatalyst filter 5 can be bent such that the concave surface of the photocatalyst filter 5 is irradiated with light from a light source section 10. This can reduce the unevenness in the amount of light received by the photocatalyst filter 5 and can enhance the ability of decomposing ozone gas or VOC.

The photocatalyst filter 5 can have a curved surface such that the distance from the light source section 10 to the photocatalyst filter 5 is substantially constant. The photocatalyst filter 5 can have a curved surface such that the difference between the distance from the light source section 10 to one point of the photocatalyst filter 5 and the average of such distances is ±10% or less of the average in 80% or more of the entire curved surface. This allows the photocatalyst filter 5 to be uniformly irradiated with light from the light source section 10.

For example, as shown in FIG. 3A, the photocatalyst filter 5 may be bent so as to uniformly receive the light emitted by one LED array. Alternatively, as shown in FIG. 3B, the photocatalyst filter 5 may be bent so as to uniformly receive the light emitted by two LED arrays disposed side by side.

Third Embodiment

Figure 4:
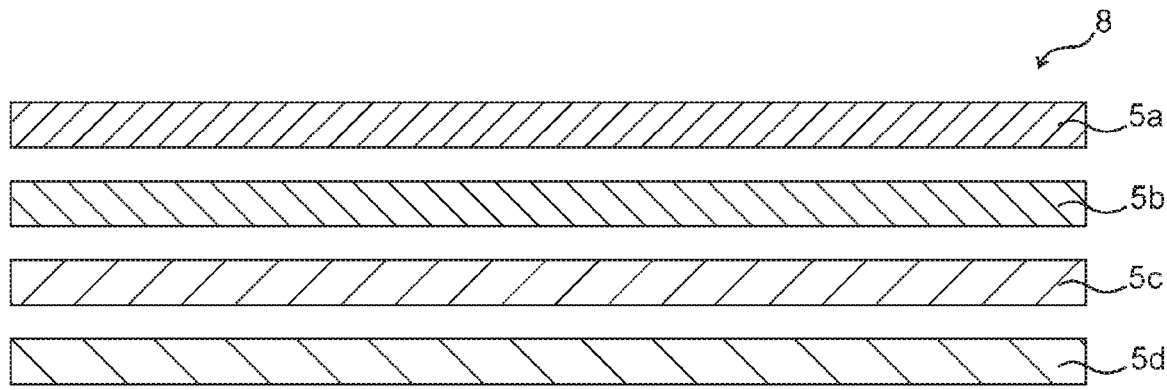
FIG. 4 is a schematic cross-sectional view of a photocatalyst filter laminate of an embodiment of the present disclosure.

FIG. 4 is a schematic cross-sectional view of a photocatalyst filter laminate 8 of this Embodiment. The photocatalyst filters 5 included in the photocatalyst filter laminate 8 of the Embodiment are the same as the photocatalyst filter 5 of First Embodiment.

The photocatalyst filter laminate 8 of the Embodiment can be applied to, for example, an air cleaner, a gas treatment apparatus, a deodorizing apparatus, and a sterilization (antibacterial) apparatus. Furthermore, the photocatalyst filter laminate 8 can provide additional functions to application products, such as a vacuum cleaner, a washing machine, a lighting system, an air conditioner, and a copier. The photocatalyst filter laminate 8 of Fourth Embodiment is also the same.

The photocatalyst filter laminate 8 has a structure where a plurality of photocatalyst filters 5 are stacked. The stacking of the photocatalyst filters 5a to 5d increases the probability that ozone gas or VOC contained in the air that is allowed to pass through the photocatalyst filter laminate 8 is decomposed by the photocatalyst layer 3 and can enhance the reactivity. In addition, the ventilation resistance of the photocatalyst filter laminate 8 can be suppressed from increasing by stacking a plurality of the photocatalyst filters 5 having an aperture ratio of 35% or more and 80% or less.

The photocatalyst filter laminate 8 can have a structure where, for example, two or more and ten or less photocatalyst filters 5 are stacked. The photocatalyst filter laminate 8 may be produced by stacking a plurality of photocatalyst filters 5 having substantially the same aperture ratio or may be produced by stacking a plurality of photocatalyst filters 5 having different aperture ratios.

The photocatalyst filter laminate 8 can be configured such that the space between two adjacent photocatalyst filters 5 is 1 mm or more and 5 mm or less. Such a configuration can prevent formation of a shadow in the inside of the photocatalyst filter laminate 8 and can suppress a reduction in photocatalytic activity of the photocatalyst filter 5 disposed inside the photocatalyst filter laminate 8 and the photocatalyst filter 5 disposed at the surface opposite to the light-receiving surface. In addition, it is possible to suppress an increase in the ventilation resistance of the photocatalyst filter laminate 8 by restricting the average space (average gap) between two adjacent photocatalyst filters 5 to 1 mm or more and 5 mm or less.

The photocatalyst filter laminate 8 may have a thickness of 1 mm or more and 15 mm or less, preferably 2 mm or more and 10 mm or less. This can increase the probability that ozone gas or VOC contained in the air that is allowed to pass through the photocatalyst filter laminate 8 is decomposed by the photocatalyst layer 3 and can enhance the reactivity. In addition, it is possible to suppress a reduction in the light irradiation intensity, and the decomposition ability can avoid from being restricted. It is also possible to suppress an increase in the ventilation resistance of the photocatalyst filter laminate 8.

The thickness of the photocatalyst filter laminate 8 can be adjusted by changing the number of the photocatalyst filters 5 to be stacked.

The photocatalyst filter laminate 8 may be configured such that the first photocatalyst filter 5a disposed at the surface receiving the light from the light source section 10 has an aperture ratio higher than that of a second photocatalyst filter 5b, 5c, or 5d disposed on the central portion or at the surface opposite to the light-receiving surface. Such a configuration can prevent formation of a shadow in the inside of the photocatalyst filter laminate 8 and can suppress a reduction in photocatalytic activity of the photocatalyst filter 5b or 5c disposed inside the photocatalyst filter laminate 8 and the photocatalyst filter 5d disposed at the surface opposite to the light-receiving surface.

Fourth Embodiment

Figure 5A:
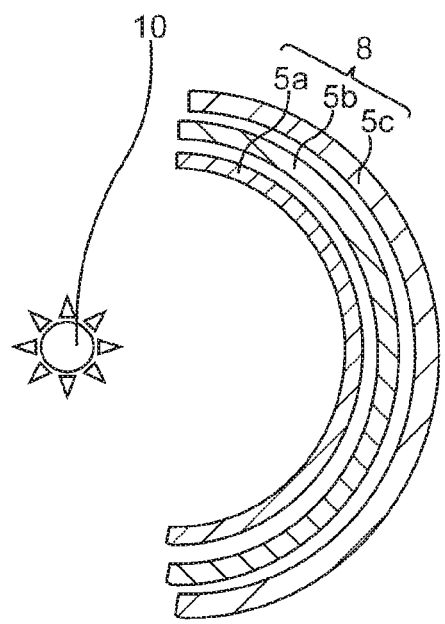
FIG. 5A is a schematic cross-sectional view of a photocatalyst filter laminate of an embodiment of the present disclosure.
Figure 5B:
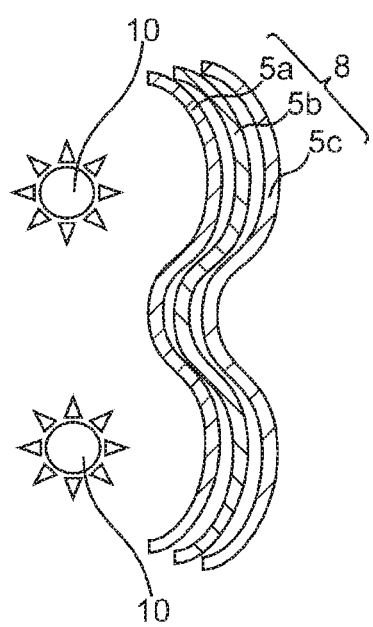
FIG. 5B is a schematic cross-sectional view of another photocatalyst filter laminate of the embodiment of the present disclosure.

FIGS. 5A and 5B are schematic cross-sectional views of photocatalyst filter laminates 8 of this Embodiment. The photocatalyst filter laminates 8 of the Embodiment each have a structure where a plurality of curved photocatalyst filters 5 are stacked. Except this point, the configurations of the photocatalyst filter laminates 8 are the same as that of the photocatalyst filter laminate 8 of Third Embodiment. In addition, the photocatalyst filters 5 included in the photocatalyst filter laminates 8 of the Embodiment are the same as the photocatalyst filter 5 of Second Embodiment.

Each of the photocatalyst filters 5 included in the photocatalyst filter laminates 8 can have a curved surface such that the distance from the light source section 10 to the photocatalyst filter 5 is substantially constant. Each of the photocatalyst filters 5 can have a curved surface such that the difference between the distance from the light source section 10 to one point of the photocatalyst filter 5 and the average of such distances is ±10% or less of the average in 80% or more of the entire curved surface. This allows the photocatalyst filter 5 to be uniformly irradiated with light from the light source section 10.

Fifth Embodiment

Figure 6:
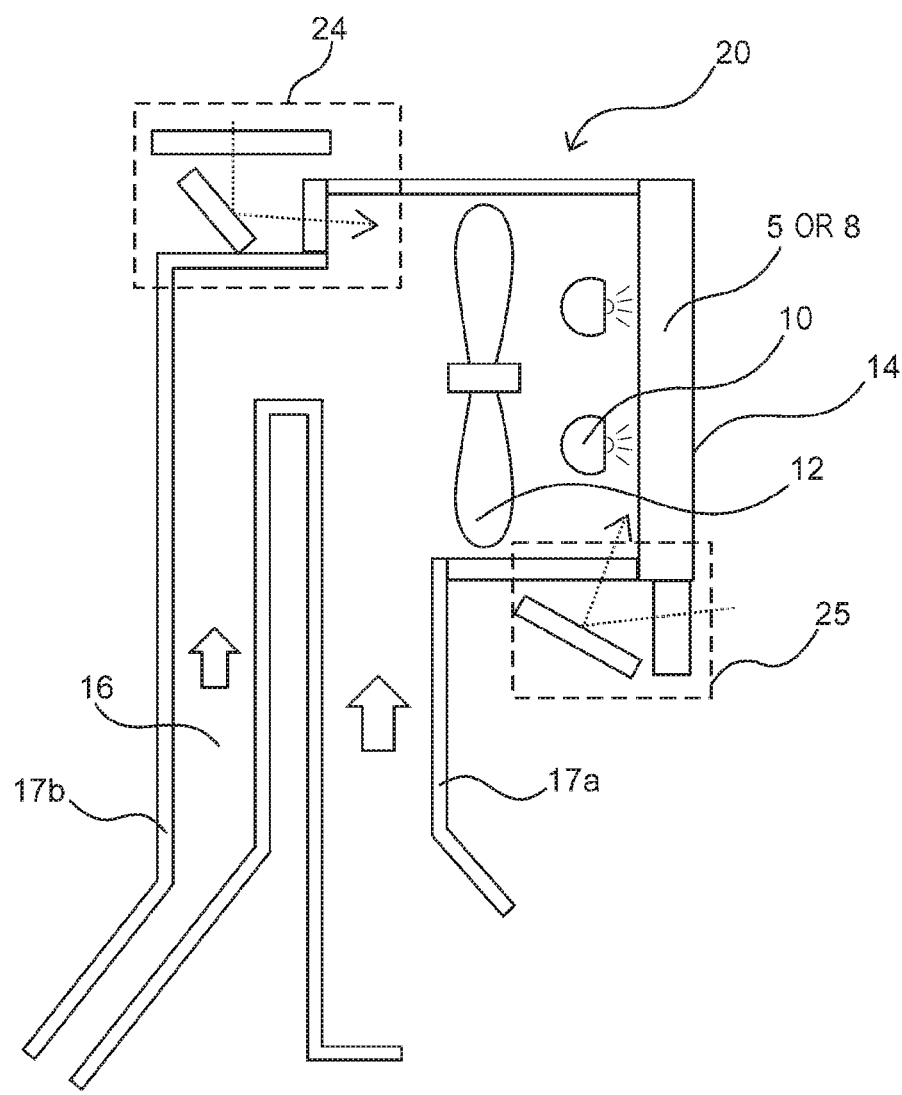
FIG. 6 is a schematic cross-sectional view of an exhaust unit of an embodiment of the present disclosure.

FIG. 6 is a schematic cross-sectional view of an exhaust unit 20 of this Embodiment.

The exhaust unit 20 includes a photocatalyst filter 5 of First or Second Embodiment or a photocatalyst filter laminate 8 of Third or Fourth Embodiment, a light source section 10 for photocatalyst irradiating the photocatalyst filter 5 or the photocatalyst filter laminate 8 with light having a wavelength of 400 nm or more, and an exhaust fan 12 configured so as to discharge gas from an exhaust port 14.

The exhaust unit 20 of the Embodiment can be applied to, for example, an air cleaner, a gas treatment apparatus, a deodorizing apparatus, and a sterilization (antibacterial) apparatus. Furthermore, the exhaust unit 20 can provide additional functions to application products, such as a vacuum cleaner, a washing machine, a lighting system, an air conditioner, and a copier.

The photocatalyst filter 5 or the photocatalyst filter laminate 8 can be disposed in the exhaust port 14. Such a configuration allows air exhausted by the exhaust unit 20 to pass through the photocatalyst filter 5 or the photocatalyst filter laminate 8, and the ozone gas and VOC contained in the air can be decomposed by the photocatalytic activity of the photocatalyst layer 3. The photocatalyst filter 5 and the photocatalyst filter laminate 8 have been described in First to Fourth Embodiments, and the descriptions thereof are omitted herein.

The light source section 10 for photocatalyst is configured such that the photocatalyst filter 5 or the photocatalyst filter laminate 8 is irradiated with light having a wavelength of 400 nm or more. This configuration allows the photocatalyst layer 3 to receive light and to exhibit a photocatalytic activity.

The light source section 10 can be, for example, an LED array having an emission peak wavelength of 400 nm or more. The exhaust unit 20 may have a single light source section 10 as shown in FIG. 3A or FIG. 5A or may have a plurality of light source sections 10 as shown in FIG. 3B or FIG. 5B.

The light source section 10 may be configured so as to irradiate the surface of the photocatalyst filter 5 or the surface of the photocatalyst filter laminate 8 at an illuminance of 800 lux or more and 3200 lux or less, preferably 1000 lux or more and 2500 lux or less, and more preferably 1500 lux or more and 2500 lux or less.

The decomposition of ozone gas or VOC is enhanced in proportion to the illuminance, and it is difficult to decompose ozone gas or VOC at an illuminance of 1000 lux or less. A high illuminance requires a large-scale light source and increases the cost, nevertheless, the decomposition ability is restricted regardless of the scale of the light source. Accordingly, the illuminance is desirably 3000 lux or less.

If the photocatalyst layer 3 contains a visible light photocatalyst, the photocatalyst layer 3 irradiated with light in the visible wavelength region of 400 to 520 nm exhibits a photocatalytic activity, and the photocatalyst layer 3 exhibits a higher photocatalytic activity when irradiated with light having a shorter emission peak wavelength. Accordingly, as the light source section 10, not only white LEDs but also blue, green, orange, red, and other-color LEDs can be used, and blue LEDs of shorter wavelengths can be suitably used.

The exhaust fan 12 is configured such that gas is discharged from the exhaust port 14. This allows the air inside the apparatus provided with the exhaust unit 20 to be discharged from the exhaust port 14, and the heat inside the apparatus can be dissipated. In addition, for example, ozone gas or VOC generated inside the apparatus can be supplied to the photocatalyst filter 5 or the photocatalyst filter laminate 8 disposed in the exhaust port 14, and the ozone gas, VOC, or the like can be decomposed by the photocatalytic activity of the photocatalyst layer 3. In addition, it is possible to suppress the discharge of ozone gas and VOC to the outside of the device.

The exhaust unit 20 may include a duct 17 for guiding air in a heat-generating portion to the exhaust port 14. In such a configuration, the exhaust unit 20 can further efficiently dissipate heat. The exhaust unit 20 may include a duct 17 for guiding air in a portion generating, for example, ozone gas or VOC to the exhaust port 14. This allows the ozone gas, VOC, or the like to be decomposed by the photocatalytic activity of the photocatalyst layer 3. The dust 17 for guiding ozone gas to the exhaust port 14 can function as an ozone gas-supplying section 16.

The exhaust unit 20 may include an ozone gas-supplying section 16 for supplying ozone gas to the photocatalyst filter 5 or the photocatalyst filter laminate 8. Such a configuration allows ozone gas to be decomposed into active oxygen (.O) in the photocatalyst layer 3. This active oxygen helps efficient oxidative decomposition of, for example, VOC. The ozone gas-supplying section 16 may be a duct 17 for guiding ozone gas generated inside the apparatus to the exhaust port 14. Alternatively, the ozone gas-supplying section 16 may be a portion generating ozone gas from oxygen gas contained in air.

In the reaction of a photocatalyst in the presence of ozone, electrons decompose the ozone into oxygen ($O_2$) and active oxygen. The active oxygen reacts with moisture to become a hydroxyl radical. Thus, the presence of ozone generates a large number of hydroxyl radicals having high oxidizing power, compared with the presence of oxygen. Accordingly, VOC can be efficiently decomposed by introducing ozone generated from a charger to a filter supporting a photocatalyst.

Sixth Embodiment

Figure 7:
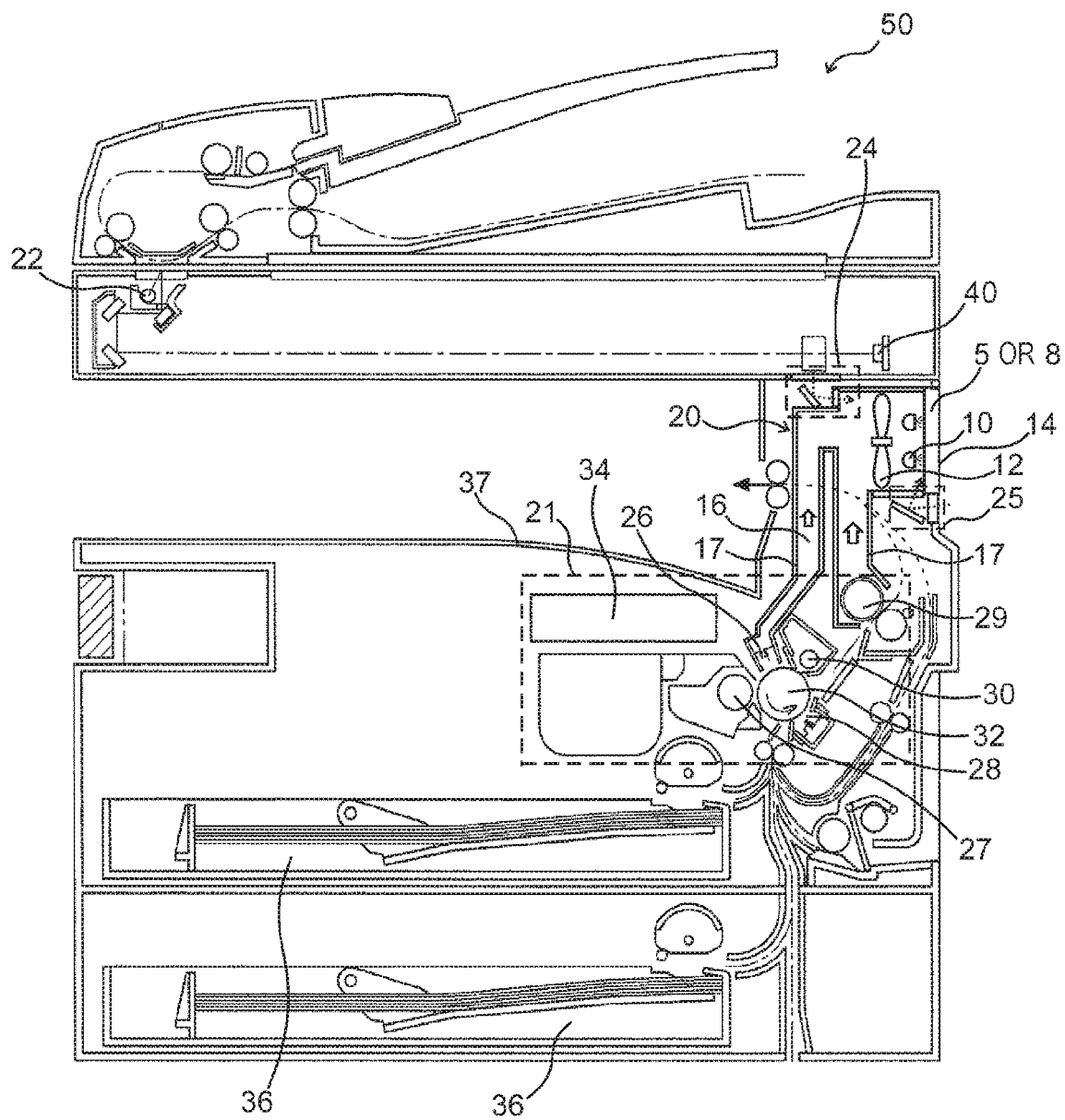
FIG. 7 is a schematic cross-sectional view of an image forming apparatus of an embodiment of the present disclosure.

FIG. 7 is a schematic cross-sectional view of an image forming apparatus 50 of this Embodiment.

The image forming apparatus 50 of the Embodiment includes an exhaust unit 20 of Fifth Embodiment and a printing section 21 performing charging, exposure, development, transfer, and fixing. In the Embodiment, the printing section 21 is configured so as to perform monochromic printing.

The printing section 21 includes a charger 26 for charging a photoreceptor 32. During charging of the photoreceptor 32 with the charger 26, ozone gas is generated from oxygen gas in air. The generated ozone gas can be decomposed by the photocatalyst filter 5 or the photocatalyst filter laminate 8 by disposing a duct 17 for guiding air in the vicinity of the charger 26 to the exhaust port 14 and exhausting gas by the exhaust fan 12. Consequently, an increase in the concentration of the ozone gas inside the image forming apparatus 50 is prevented, and the printing quality is prevented from being deteriorated due to ozone gas. In the photocatalyst layer 3, active oxygen can be generated from ozone gas, and the oxidation activity of, for example, VOC can be enhanced in the photocatalyst layer 3.

In addition, NOx may be generated from the charger 26. This NOx can also be decomposed by the photocatalyst filter 5 or the photocatalyst filter laminate 8.

The printing section 21 includes a fixing device 29 for fixing toner images to paper by heating. Heating of a toner image by the fixing device 29 causes occurrence of VOC. The generated VOC can be decomposed by the photocatalyst filter 5 or the photocatalyst filter laminate 8 by disposing a duct 17 for guiding air in the vicinity of the fixing device 29 to the exhaust port 14 and exhausting gas by the exhaust fan 12.

In the fixing device 29, since toner images are heated, the periphery of the fixing device 29 tends to be overheated. The overheating can be prevented by exhausting the air in the vicinity of the fixing device 29 by a duct 17 and the exhaust fan 12. Since the photocatalyst filter 5 has a low ventilation resistance, the overheating can be suppressed.

The VOC generated in the fixing device 29 is an organic compound, such as toluene and formaldehyde, and is formed of C—C bonds and C—H bonds. The binding energies of these bonds are each 80 to 110 kcal/mol. These bonds are cleaved by collision of VOC with an oxidizing substance having higher energy than that of VOC, and the VOC is finally decomposed into water and carbon dioxide. Since the energy of a hydroxyl radical (.OH) is 120 kcal/mol, VOC can be oxidatively decomposed in the photocatalyst layer 3.

The exhaust unit 20 can include both a duct 17 for guiding air in the vicinity of the charger 26 to the exhaust port 14 and a duct 17 for guiding air in the vicinity of the fixing device 29 to the exhaust port 14. This configuration allows the ozone gas generated in the charger 26 to be decomposed into active oxygen by the photocatalyst layer 3 and allows the VOC generated in the fixing device 26 to be decomposed by using this active oxygen.

The exhaust unit 20 can be disposed on the upper side of the fixing device 29. In such a configuration, the climbing power of air heated in the fixing device 29 can be used for exhausting gas. In addition, NOx and VOC naturally enter the exhaust unit 20 by an upward air flow due to the heat generated in the fixing device 29, resulting in high efficiency. Furthermore, the rotation of the exhaust fan 12 in the exhaust unit 20 causes a synergistic effect with this flow. Since the exhaust fan 12 helps the movement of air when the fixing device 29 is not sufficiently warmed, the exhaust fan 12 may be driven only in such a case.

The image forming apparatus 50 can include a first window section 24 and a light source section 22 for an image scanner. The first window section 24 can be disposed such that the photocatalyst filter 5 or the photocatalyst filter laminate 8 is irradiated with light from the light source section 22. This configuration can increase the amount of light received by the photocatalyst layer 3 and can enhance the photocatalytic activity of the photocatalyst layer 3. As a result, ozone gas or VOC can be efficiently decomposed. The first window section 24 may be constituted of, for example, a light transmissive member and a mirror.

The exhaust unit 20 can be disposed between the fixing device 29 and an image scanner section. Such a configuration has advantages that the light from the image scanner section can be easily guided and that a lighting slit can be readily disposed near a light source such as an outside lighting system.

The image forming apparatus 50 can include a second window section 25. The second window section 25 can be disposed such that the photocatalyst filter 5 or the photocatalyst filter laminate 8 is irradiated with light outside the image forming apparatus 50. In such a configuration, the amount of light received by the photocatalyst layer 3 can be increased, and the photocatalytic activity of the photocatalyst layer 3 can be enhanced. As a result, ozone gas or VOC can be efficiently decomposed. The second window section 25 may be constituted of, for example, a lighting slit, a light transmissive member, and a mirror.

Seventh Embodiment

Figure 8:
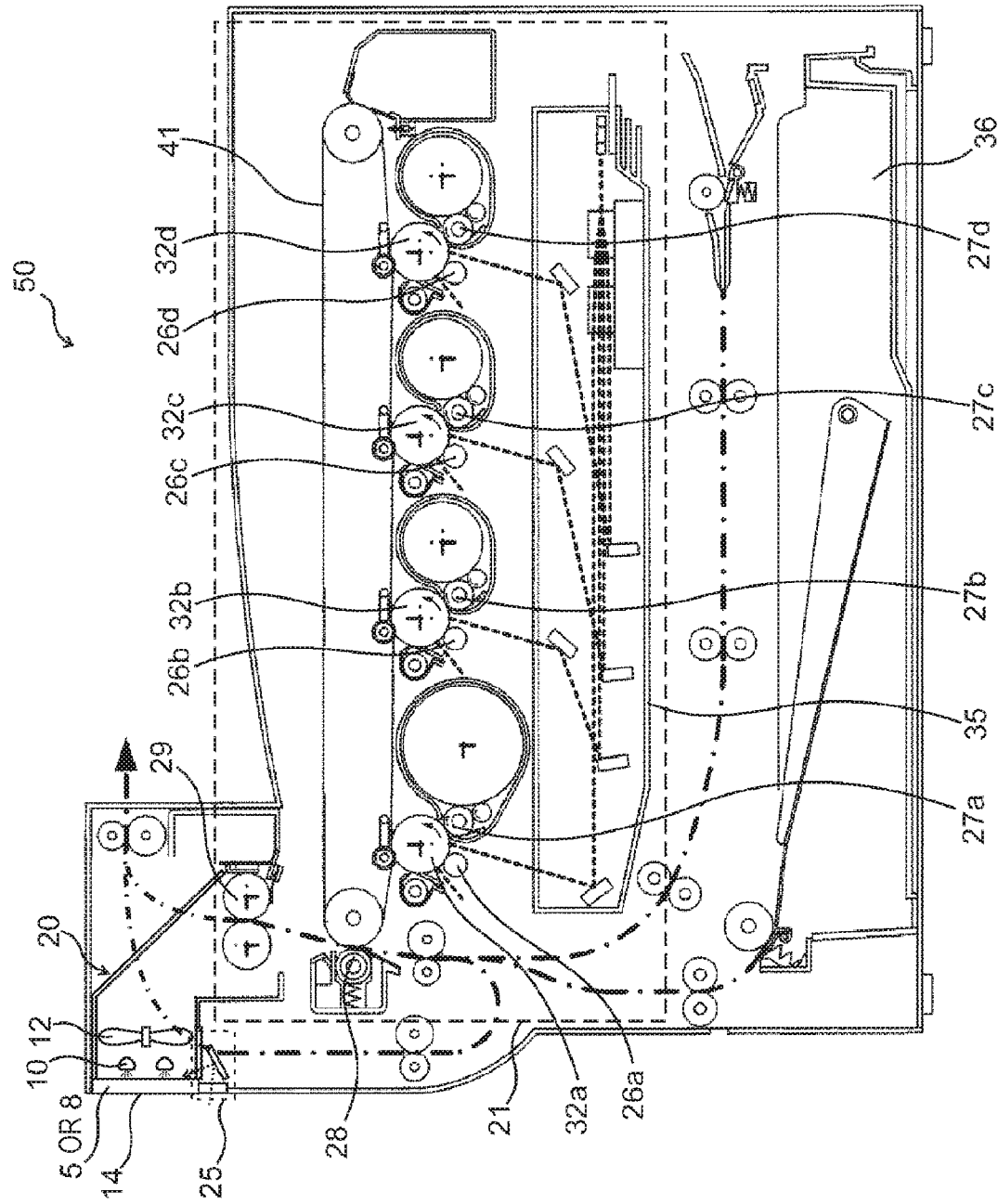
FIG. 8 is a schematic cross-sectional view of an image forming apparatus of an embodiment of the present disclosure.

FIG. 8 is a schematic cross-sectional view of an image forming apparatus of this Embodiment. In the Embodiment, the printing section 21 is configured so as to perform color printing. Except this point, the configuration of the image forming apparatus 50 is the same as that of the image forming apparatus 50 of Sixth Embodiment. Although the image forming apparatus 50 shown in FIG. 8 does not have any image scanner, the image forming apparatus 50 of the Embodiment may include an image scanner.

Since an image forming apparatus for color printing includes a plurality of chargers 26a to 26d, the exhaust unit 20 can be disposed such that the air of the printing section 21 is wholly exhausted. Such a configuration can decompose ozone gas generated in the plurality of chargers 26 by the photocatalyst filter 5 or the photocatalyst filter laminate 8.

EXPERIMENTS

1. Preparation of Photocatalyst Dispersion

A powder (100 g) of tungsten oxide (manufactured by Kishida Chemical Co., Ltd., product code: 200-81542) and grains (0.5 g) of platinum carbon (manufactured by Kishida Chemical Co., Ltd., product code: 200-62735) were mixed. The mixture was stirred with a mixer and was then sieved through a 100-mesh sieve to remove coarse particles.

A phenyl methyl silicone resin (trade name: SILPES KX, active ingredient: 50%) manufactured by Shin-Etsu Chemical Co., Ltd. was used as a binder.

The powder (80 parts by weight) prepared above, SILPES KX (40 parts by weight, active ingredient: 20 parts by weight), and xylene (130 parts by weight) were dispersed with a bead disperser to obtain a photocatalyst dispersion.

2. Production of Photocatalyst Filter

Photocatalyst filters shown in Table 1 to be used in Examples 1 to 22 and Comparative Examples 2 to 4 were produced. In Comparative Example 1, a filter substrate not subjected to application of a photocatalyst was used.

A filter substrate was immersed in the prepared photocatalyst dispersion to apply the photocatalyst dispersion onto the surface of the filter substrate. The filter after the application was heat-treated with a high back oven at 200° C. for 30 minutes to dry the coating liquid layer to produce photocatalyst filters shown in FIGS. 1 and 2.

As the filter substrate, plain woven stainless steel wire netting of 2.5- to 70-mesh shown in Tables 1 and 2 was used. Table 2 shows the aperture ratio and wire diameter of each filter substrate. The 2.5-mesh filter substrate was that manufactured by Igeta, Inc., and other filter substrates were those manufactured by Okutani Wire Netting, Mfg. Co., Ltd.

TABLE 1

| | Mesh number of filter substrate | Photocatalyst application | Number of filter | Thickness | Average space | Aperture ratio of photocatalyst filter | Shape |
|---|---|---|---|---|---|---|---|
| Example 1 | 20-mesh | Done | Three-ply | 5 mm | 1.3 mm | 50% | Curved shape (FIG. 5A) |
| Example 2 | 20-mesh | Done | Three-ply | 5 mm | 1.3 mm | 50% | Curved shape (FIG. 5A) |
| Example 3 | 20-mesh | Done | Three-ply | 5 mm | 1.3 mm | 50% | Curved shape (FIG. 5A) |
| Example 4 | 20-mesh | Done | One | 0.8 mm | | 50% | Curved shape (FIG. 5A) |
| Example 5 | 20-mesh | Done | Nine-ply | 15 mm | 1.0 mm | 50% | Curved shape (FIG. 5A) |
| Example 6 | 32-mesh | Done | Three-ply | 5 mm | 1.5 mm | 35% | Curved shape (FIG. 5A) |
| Example 7 | 16-mesh | Done | Three-ply | 5 mm | 1.8 mm | 74% | Curved shape (FIG. 5A) |
| Example 8 | 20-mesh | Done | Three-ply | 5 mm | 1.3 mm | 50% | Flat plate |
| Example 9 | 20-mesh | Done | Three-ply | 5 mm | 1.3 mm | 50% | Curved shape (FIG. 5B) |
| Example 10 | 20-mesh | Done | Three-ply | 5 mm | 1.3 mm | 50% | Curved shape (FIG. 5A) |
| Example 11 | 20-mesh | Done | Three-ply | 5 mm | 1.3 mm | 50% | Curved shape (FIG. 5A) |
| Example 12 | 32-, 20-, and 16-memsh | Done | Three-ply | 5 mm | 1.5 mm | 35%, 50%, 74% | Curved shape (FIG. 5A) |
| Example 13 | 2.5-mesh | Done | Three-ply | 7.5 mm | 1.2 mm | 80% | Curved shape (FIG. 5A) |
| Example 14 | 24-mesh | Done | Three-ply | 5 mm | 1.3 mm | 40% | Curved shape (FIG. 5A) |
| Example 15 | 20-mesh | Done | Two-ply | 6 mm | 4.4 mm | 50% | Curved shape (FIG. 5A) |
| Example 16 | 16-mesh | Done | Two-ply | 2 mm | 1.0 mm | 74% | Curved shape (FIG. 5A) |
| Example 17 | 16-mesh | Done | Five-ply | 8 mm | 1.4 mm | 74% | Curved shape (FIG. 5A) |
| Example 18 | 4-mesh | Done | Two-ply | 10 mm | 1.8 mm | 45% | Curved shape (FIG. 5A) |
| Example 19 | 70-mesh | Done | Four-ply | 5 mm | 1.3 mm | 43% | Curved shape (FIG. 5A) |
| Example 20 | 20-mesh | Done | Three-ply | 5 mm | 1.3 mm | 50% | Curved shape (FIG. 5A) |
| Example 21 | 20-mesh | Done | Three-ply | 5 mm | 1.3 mm | 50% | Curved shape (FIG. 5A) |
| Example 22 | 20-mesh | Done | Three-ply | 5 mm | 1.3 mm | 50% | Curved shape (FIG. 5A) |
| Comparative Example 1 | 20-mesh | Not done | Three-ply | 5 mm | 1.3 mm | 50% | Curved shape (FIG. 5A) |
| Comparative Example 2 | 20-mesh | Done | Three-ply | 5 mm | 1.3 mm | 50% | Curved shape (FIG. 5A) |
| Comparative Example 3 | 20-mesh | Done | Three-ply | 5 mm | 1.3 mm | 50% | Curved shape (FIG. 5A) |
| Comparative Example 4 | 50-mesh | Done | Three-ply | 5 mm | 1.8 mm | 25% | Curved shape (FIG. 5A) |

TABLE 2

| | Substrate | | Photocatalyst filter | |
|---|---|---|---|---|
| Mesh | Aperture ratio (%) | Wire diameter (mm) | Aperture ratio (%) | Thickness (mm/filter) |
| 2.5 | 84.6 | 0.8 | 80 | 1.7 |
| 16 | 76.6 | 0.2 | 74 | 0.5 |

TABLE 2-continued

| | Substrate | | Photocatalyst filter | |
|---|---|---|---|---|
| Mesh | Aperture ratio (%) | Wire diameter (mm) | Aperture ratio (%) | Thickness (mm/filter) |
| 20 | 51.8 | 0.35 | 50 | 0.8 |
| 24 | 42.3 | 0.37 | 40 | 0.8 |
| 32 | 38.4 | 0.3 | 35 | 0.7 |
| 50 | 29.9 | 0.23 | 25 | 0.5 |
| 70 | 44.8 | 0.12 | 43 | 0.3 |
| 4 | 46.9 | 2 | 45 | 4.1 |

3. Measurement of Aperture Ratio and Thickness

The aperture ratio of each of the resulting photocatalyst filters was measured with an image processor. The average thickness of each of the resulting photocatalyst filters was measured. The results of measurement are shown in Table 2.

4. Production of Photocatalyst Filter Laminate

The resulting photocatalyst filters were curved as shown in FIG. 5A or 5B, and three curved photocatalyst filters were stacked to produce photocatalyst filter laminates of Examples 1 to 3, 6, 7, 9 to 14, 20 to 22 and Comparative Examples 2 to 4 shown in Table 1. Photocatalyst filter laminates were produced by stacking two photocatalyst filters in Examples 15, 16, and 18, stacking four photocatalyst filters in Example 19, and stacking five photocatalyst filters in Example 17. These photocatalyst filter laminates were produced by stacking photocatalyst filters having the same mesh number, except Example 12.

In Example 4, a single photocatalyst filter was used without producing a photocatalyst filter laminate.

In Example 5, nine curved photocatalyst filters were stacked to produce a photocatalyst filter laminate.

In Example 8, the photocatalyst filters were not curved, and three flat photocatalyst filters were stacked to produce a photocatalyst filter laminate.

In Example 12, a photocatalyst filter laminate was produced such that a 16-mesh photocatalyst filter was disposed on the light source section side, a 20-mesh photocatalyst filter was positioned on the center, and a 32-mesh photocatalyst filter was disposed on the side opposite to the light source section side.

In Comparative Example 1, three filter substrates not subjected to application of a photocatalyst were stacked to produce a filter laminate.

Table 1 shows the average thickness and the average space in each photocatalyst filter laminate.

In the photocatalyst filters of Examples 1 to 7, 10 to 21 and Comparative Examples 1 to 4 each having a shape as shown in FIG. 5A, the distance from the LED array as the light source section to the surface of the filter was measured at 20 points, and the difference between each distance and the average of the distances was ±10% or less of the average in 80% or more of the 20 points. In the shape of the photocatalyst filter of Example 22, when the distance from the LED array as the light source section to the surface of the filter was measured at 20 points, the difference between each distance and the average of the distances was ±10% or less of the average in about 70% of the 20 points.

5. Experiment on Cleaning of Exhaust Gas

An exhaust unit as shown in FIG. 6 was incorporated into a monochromic copier MX-M264FP manufacture by Sharp Corporation to produce a multi-function printer as shown in FIG. 7.

The photocatalyst filter or the photocatalyst filter laminate of Examples 1 to 22 and Comparative Examples 1 to 4 shown in Table 1 was incorporated into the exhaust unit, and an experiment on cleaning of exhaust gas was carried out.

As the light source section 10, an LED array for photocatalyst having an emission peak wavelength of 405 nm was used. Regarding photoirradiation, the illuminance of the photocatalyst filter was changed by combining intake of light from an LED array for photocatalyst, light from an LED for image scanner, and light from outside. In Example 9, two LED arrays for photocatalyst were disposed.

In addition, an exhaust unit of which the introduction port openable for supplying $O_3$ from the charger to the photocatalyst filter was used.

In Comparative Example 3, the experiment was carried out by closing this introduction port.

The illuminance of the filter portion was measured with an illuminometer LX-100 (manufactured by As One Corporation) on the central position of the photocatalyst filter under the condition where the filter was removed. Table 3 shows conditions, such as photoirradiation.

TABLE 3

| | Irradiation with LED array | Irradiation with Scanner LED | Irradiation with outside light | Illuminance of filter portion | $O_3$ introduction port |
|---|---|---|---|---|---|
| Example 1 | Done | Not done | Not done | 2000 lux | Opened |
| Example 2 | Done | Not done | Not done | 800 lux | Opened |
| Example 3 | Done | Not done | Not done | 3200 lux | Opened |
| Example 4 | Done | Not done | Not done | 2000 lux | Opened |
| Example 5 | Done | Not done | Not done | 2000 lux | Opened |
| Example 6 | Done | Not done | Not done | 2000 lux | Opened |
| Example 7 | Done | Not done | Not done | 2000 lux | Opened |
| Example 8 | Done | Not done | Not done | 2000 lux | Opened |
| Example 9 | Done | Not done | Not done | 2480 lux | Opened |
| Example 10 | Done | Done | Not done | 2450 lux | Opened |
| Example 11 | Done | Done | Done | 2500 lux | Opened |
| Example 12 | Done | Not done | Not done | 2000 lux | Opened |
| Example 13 | Done | Not done | Not done | 2000 lux | Opened |
| Example 14 | Done | Not done | Not done | 2000 lux | Opened |
| Example 15 | Done | Not done | Not done | 2000 lux | Opened |
| Example 16 | Done | Not done | Not done | 2000 lux | Opened |
| Example 17 | Done | Not done | Not done | 2000 lux | Opened |
| Example 18 | Done | Not done | Not done | 2000 lux | Opened |
| Example 19 | Done | Not done | Not done | 2000 lux | Opened |
| Example 20 | Done | Not done | Not done | 1000 lux | Opened |
| Example 21 | Done | Not done | Not done | 1500 lux | Opened |
| Example 22 | Done | Not done | Not done | 2000 lux | Opened |

TABLE 3-continued

|  | Irradiation with LED array | Irradiation with Scanner LED | Irradiation with outside light | Illuminance of filter portion | $O_3$ introduction port |
|---|---|---|---|---|---|
| Comparative Example 1 | Done | Done | Done | 2000 lux | Opened |
| Comparative Example 2 | Not done | Not done | Not done | 0 lux | Opened |
| Comparative Example 3 | Done | Done | Done | 2100 lux | Closed |
| Comparative Example 4 | Done | Not done | Not done | 2000 lux | Opened |

The experiment on cleaning of exhaust gas was performed as follows. A multi-function printer produced so as to repeat reading of an A4 copy with a coverage rate of 6% and printing the read data on paper for 15 minutes was operated under the conditions shown in Table 3, and changes in concentrations of $O_3$ and total volatile organic compounds (TVOC) in exhaust gas immediately after passing through the photocatalyst filter were measured. The concentration of $O_3$ was measured with an environmental $O_3$ meter Model 49i (manufactured by Thermo Fisher Scientific K.K.). The concentration of TVOC was measured with a volatile hydrocarbon meter Phochek Tiger (manufactured by Ion Science Ltd.).

The results of measurement are shown in Table 4. In the rate of $O_3$ reduction, untreated exhaust gas when the photocatalyst filter was not disposed (without applying any photocatalyst to the filter, and measured under conditions by switching off the LED array for photocatalyst, blocking outside light and the LED light for image scanner, and closing the $O_3$ introduction port) was used for comparison. The rate of $O_3$ reduction was calculated by $(1-B/A) \times 100$, where A denotes the measured value of $O_3$ concentration in untreated exhaust gas, and B denotes the measured value of $O_3$ concentration in Example or Comparative Example. The $O_3$ reduction was judged as follows: A rate of $O_3$ reduction of 90% or more is Excellent, a rate of $O_3$ reduction of 75% or more and less than 90% is Good, and a rate of $O_3$ reduction of less than 75% is Poor.

TABLE 4

|  | Rate of $O_3$ reduction | Judgment of $O_3$ reduction | Rate of VOC reduction | Judgment of VOC reduction | Total judgment |
|---|---|---|---|---|---|
| Example 1 | 92% | Excellent | 77% | Excellent | Excellent |
| Example 2 | 78% | Good | 52% | Good | Fair |
| Example 3 | 94% | Excellent | 80% | Excellent | Excellent |
| Example 4 | 79% | Good | 53% | Good | Fair |
| Example 5 | 94% | Excellent | 81% | Excellent | Excellent |
| Example 6 | 78% | Good | 55% | Good | Fair |
| Example 7 | 93% | Excellent | 79% | Excellent | Excellent |
| Example 8 | 84% | Good | 70% | Good | Fair |
| Example 9 | 95% | Excellent | 80% | Excellent | Excellent |
| Example 10 | 93% | Excellent | 79% | Excellent | Excellent |
| Example 11 | 94% | Excellent | 80% | Excellent | Excellent |
| Example 12 | 95% | Excellent | 80% | Excellent | Excellent |
| Example 13 | 75% | Good | 51% | Good | Fair |
| Example 14 | 90% | Excellent | 72% | Good | Good |
| Example 15 | 82% | Good | 60% | Good | Fair |
| Example 16 | 89% | Good | 75% | Excellent | Good |
| Example 17 | 92% | Excellent | 80% | Excellent | Excellent |
| Example 18 | 85% | Good | 75% | Excellent | Good |
| Example 19 | 90% | Excellent | 73% | Good | Good |
| Example 20 | 90% | Excellent | 74% | Good | Good |
| Example 21 | 91% | Excellent | 76% | Excellent | Excellent |
| Example 22 | 85% | Good | 72% | Good | Fair |
| Comparative Example 1 | 1% | Poor | 0% | Poor | Poor |
| Comparative Example 2 | 1% | Poor | 0% | Poor | Poor |
| Comparative Example 3 | 0% | Poor | 5% | Poor | Poor |
| Comparative Example 4 | 53% | Poor | 45% | Poor | Poor |

In the rate of VOC reduction, untreated exhaust gas when the photocatalyst filter was not disposed (without applying any photocatalyst to the filter, and measured under conditions by switching off the LED array for photocatalyst, blocking outside light and the LED light for image scanner, and closing the $O_3$ introduction port) was used for comparison. The rate of VOC reduction was calculated by $(1-D/C) \times 100$, where C denotes the measured value of VOC concentration in untreated exhaust gas, and D denotes the measured value of VOC concentration in Example or Comparative Example. The VOC reduction was judged as follows: A rate of VOC reduction of 75% or more is Excellent, a rate of VOC reduction of 50% or more and less than 75% is Good, and a rate of VOC reduction of less than 50% is Poor.

The total judgment was as follows: A sample judged as Excellent in both the judgment of $O_3$ reduction and the judgment of VOC reduction is judged as Excellent; a sample judged as Excellent in one of the judgment of $O_3$ reduction and the judgment of VOC reduction and judged as Good in the other is judged as Good; a sample judged as Good in both the judgment of $O_3$ reduction and the judgment of VOC reduction is judged as Fair; and a sample judged as Poor in either of the judgment of $O_3$ reduction and the judgment of VOC reduction is judged as Poor. A sample judged as Fair or better was concluded that there is no problem in actual use.

As shown in Table 4, the total judgments of Examples 1 to 22 were Excellent, Good, or Fair, whereas the total judgments of Comparative Examples 1 to 4 were Poor.

Comparative Example 1 was judged as Poor in the total judgment probably because that a filter not subjected to application of a photocatalyst was used. Comparative Example 2 was judged as Poor in the total judgment probably because that the photocatalyst filter was not irradiated by the LED array. Comparative Example 3 was judged as Poor in the total judgment probably because that the $O_3$ introduction port was closed. Comparative Example 4 was judged as Poor in the total judgment probably because that the small aperture ratio of the photocatalyst filter increased the ventilation resistance.

The present disclosure contains subject matter related to that disclosed in Japanese Priority Patent Application JP 2016-132532 filed in the Japan Patent Office on Jul. 4, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An exhaust unit comprising:
a photocatalyst filter laminate;
a first light source to irradiate the photocatalyst filter laminate with light having a wavelength of 400 nm or more; and
an exhaust fan to discharge gas from an exhaust port, wherein
the photocatalyst filter laminate is disposed in the exhaust port;
the photocatalyst filter laminate includes a first photocatalyst filter disposed at a surface receiving light from the first light source and a second photocatalyst filter disposed on a central portion of the photocatalyst filter laminate or at a surface opposite to the light-receiving surface;
the first photocatalyst filter has an aperture percentage higher than an aperture percentage of the second photocatalyst filter;
the first photocatalyst filter and the second photocatalyst filter are stacked;
the photocatalyst filter laminate has a thickness of 1 mm or more and 10 mm or less;
each of the first photocatalyst filter and the second photocatalyst filter includes a sheet-shaped filter substrate and a photocatalyst layer supported by the filter substrate,
the filter substrate is a wire netting, a punching metal, an expand metal, a non-woven fabric, a fabric, a resin molding, or a paper honeycomb sheet;
the photocatalyst layer exhibits a photocatalytic action by receiving the light having a wavelength of 400 nm or more;
the aperture percentage of each of the first photocatalyst filter and the second photocatalyst filter is 35% or more and 80% or less; and
the aperture percentage is a proportion of a through opening area per unit area of the photocatalyst filter.

2. The exhaust unit according to claim 1, wherein the filter substrate has a curved shape.

3. The exhaust unit according to claim 1, wherein
the photocatalyst filter laminate has a curved shape; and
the first light source irradiates the light to a concave surface of the photocatalyst filter laminate.

4. The exhaust unit according to claim 1, wherein
the first light source includes a light emitting diode and irradiates a surface of the photocatalyst filter laminate at an illuminance of 1000 lux or more and 3000 lux or less.

5. The exhaust unit according to claim 1, further comprising:
an ozone gas supply to provide supplying ozone gas to the photocatalyst filter laminate.

6. An image forming apparatus comprising:
an exhaust unit according to claim 1; and
a printer to perform charging, exposure, development, transfer, and fixing, wherein
the exhaust fan functions such that air heated by the printer is discharged from the exhaust port to dissipate heat and that ozone gas or a volatile organic compound generated in the printer is supplied to the photocatalyst filter laminate.

7. The image forming apparatus according to claim 6, further comprising:
a first window; and
a second light source for an image scanner, wherein
the photocatalyst filter laminate is irradiated with light from the second light source by the first window.

8. The image forming apparatus according to claim 6, further comprising:
a second window, wherein
the photocatalyst filter laminate is irradiated with light outside the image forming apparatus by the second window.

* * * * *